Jan. 2, 1951     C. E. KESSEL     2,536,943
ANIMAL BATH
Filed May 13, 1949
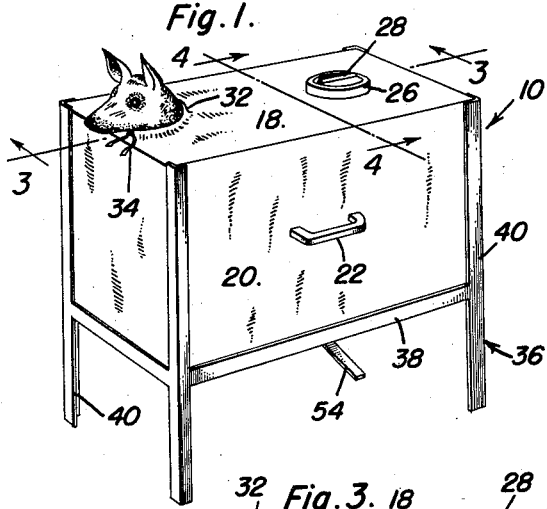
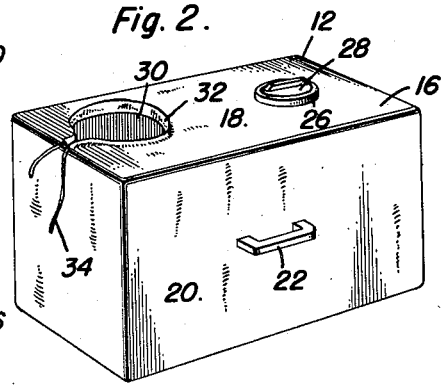
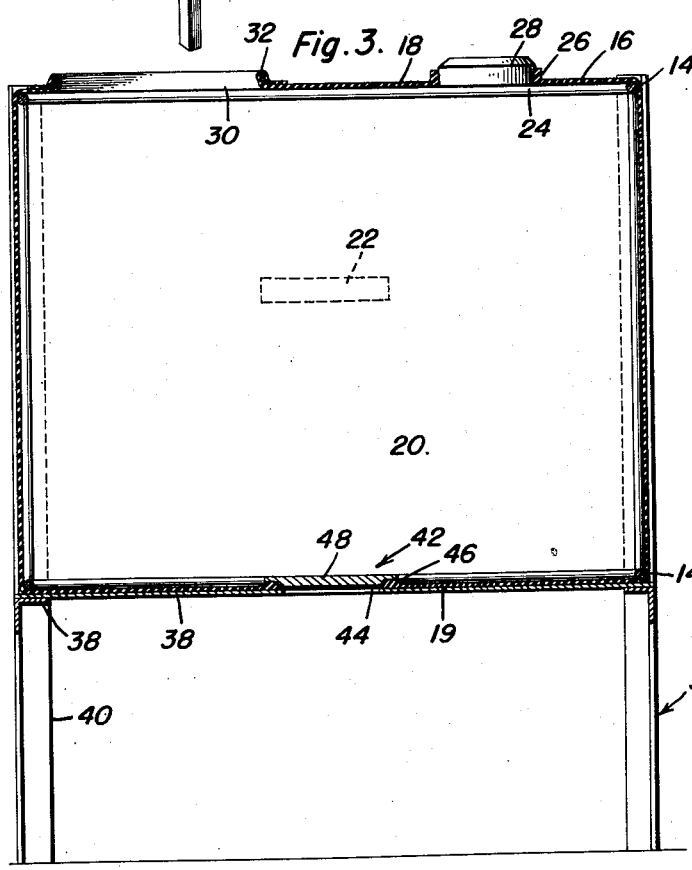
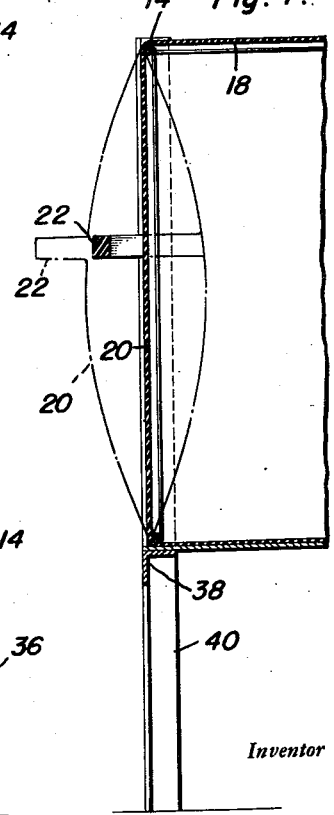
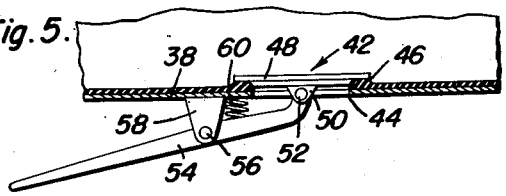
Inventor
Charles E. Kessel Patented Jan. 2, 1951

2,536,943

UNITED STATES PATENT OFFICE 2,536,943

ANIMAL BATH

Charles E. Kessel, Ripley, W. Va.

Application May 13, 1949, Serial No. 93,011

3 Claims. (Cl. 119—1)

This invention relates to an animal bath and is particularly designed and constructed for bathing domestic animals.

The primary object of this invention is to enable an animal to be thoroughly cleansed while retaining the animal in a fluid-tight enclosure, so that the person bathing the animal is not exposed to the washing or rinsing fluids and the necessity of applying the wash or rinse fluids by hand is avoided.

Another important object of this invention is to provide a flexible box-like receptacle or enclosure, within which an animal is placed, the receptacle being formed with an adjustable closure adapted to receive the neck of the animal and to be secured around the neck of the animal, so that the animal is constrained within the receptacle and the fluid therein is prevented from splashing outside of the receptacle or enclosure.

A further object of this invention is to provide a flexible animal-receiving and retaining enclosure or tub having filling means and draining means associated therewith, so that wash and rinse fluids may be sequentially introduced into and removed from the tub or receptacle.

Yet a further important object of this invention is to provide an animal tub which is formed with flexible sides, so that the sides may be reciprocated to agitate the fluid in the tub or enclosure and force the same against and around the body of the animal therein.

These ancillary objects and structural features of merit are attained by this invention, a preferred embodiment of which is set forth in the following description and illustrated in the accompanying drawings, wherein:

Figure 1 is a view in perspective of the flexible tub or enclosure, constructed in accordance with the principles of this invention and illustrating the same in a supported position on a supporting frame;

Figure 2 is a view in perspective of the tub per se;

Figure 3 is a vertical sectional view taken on the longitudinal plane of line 3—3 of Figure 1;

Figure 4 is a cross-sectional view taken on line 4—4 of Figure 1; and

Figure 5 is an enlarged elevational view of the drain means provided, with the tub illustrated in fragmentary section.

In the drawings, the novelly constructed animal bathing apparatus 10 includes a box-like receptacle or tub 12. The enclosure or tub 12 includes an open box-like framework 14 around which is secured a box-like flexible sheath or cover 16. The cover 16 includes an upper top section 18 and a parallel lower section 18 and opposing parallel sides 20. The sides 20 are provided with outstanding handles 22, for a purpose to be described. An opening 24 is formed in the top 18 and is surrounded by an upstanding rim or flange 26, the latter being provided to receive a plug 28, which is adapted to fit within the opening.

Another opening 30 is formed in the top 18 of the cover and a casing 32 surrounds the opening to receive a drawstring 34, whereby the size of the opening may be adjusted and the casing 32 may be tightly secured around the neck of an animal placed within the covering or tub.

A supporting frame 36 is provided to support the tub or box-like receptacle and closure in a horizontally disposed position at a convenient height for a person bathing an animal. The supporting frame includes a rectangular frame 38, which is formed from angle irons at the corners of which are integrally secured upstanding angle irons or standards 40.

Drain means 42 is formed in the bottom section 19 of the cover, the bottom section being formed with an opening 44 having an inner upstanding ridge 46, the latter defining a valve seat. A valve 48 is adapted to seat on the rim 46 and is formed with a depending apertured ear 50 to which is pivotally secured, as at 52, an operating lever 54. The operating lever 54 is pivoted, as at 56, to a bracket 58 which depends from the frame 38. A spring 60 is disposed between the operating lever and the frame 38 in advance of the bracket 58 and functions to normally retain the valve 48 in a closure placement on the valve seat.

In operation, an animal is placed within the tub or box-like receptacle and the drawstring 34 is tightened around the neck of the animal to retain the animal within the tub and to provide a fluid-tight enclosure. The plug 28 is removed and wash fluid is introduced into the tub. The plug is then reinserted and the sides 20 are reciprocated by grasping the handles 22 and moving the sides inwardly and outwardly to agitate the fluid therein. After the wash cycle has been completed, the valve 48 is raised by the lever 54 and the fluid is removed. Rinse fluid is then introduced through the opening 24, after removing the plug 28, and this fluid is agitated within the tub or enclosure to rinse the animal.

It can thus be seen that there is provided a device whereby an animal may be easily and conveniently washed, without the necessity of the person giving the animal a bath applying the fluid with his hands and without any danger of the person getting splashed. Such a device will be found of great value in apartments, homes, and the like where space is limited and the splashing of water by an animal is desired to be avoided.

Of course, since various changes may be effected in the device and various embodiments may be employed, it is not desired to restrict this invention to the above embodiments, and limitation is sought only in accordance with the appended claims.

Having described the invention, what is claimed as new is:

1. An animal bath comprising an open frame structure, a flexible box-like housing enveloping said frame structure, said housing being formed with an adjustable opening in its top section for securing an animal in the receptacle, filling means for depositing fluid in the housing, drain means for said housing and a supporting frame for said housing, said housing being provided at its opposing sides with handles for reciprocating said sides to agitate fluid in the housing.

2. An animal bath comprising an open frame structure, a flexible box-like housing enveloping said frame structure, said housing being formed with an adjustable opening in its top section for securing an animal in the receptacle, filling means for depositing fluid in the housing, drain means for said housing and a supporting frame for said housing, said housing being provided at its opposing sides with handles for reciprocating said sides to agitate fluid in the housing, said frame structure including a plurality of rods joined together to form an open box-like frame.

3. An animal bath comprising an open frame structure, a flexible box-like housing enveloping said frame structure, said housing being formed with an adjustable opening in its top section for securing an animal in the receptacle, filling means for depositing fluid in the housing, drain means for said housing and a supporting frame for said housing, said housing being provided at its opposing sides with handles for reciprocating said sides to agitate fluid in the housing, said drain means includes a valve, resilient means for normally retaining said valve in a closed position and means for opening said valve.

CHARLES E. KESSEL.

REFERENCES CITED

The following references are of record in the file of this patent:

UNITED STATES PATENTS

| Number | Name | Date |
|---|---|---|
| 301,637 | Somerville et al. | July 8, 1884 |
| 349,357 | Purson | Sept. 21, 1886 |
| 624,420 | Atwater et al. | May 2, 1899 |
| 1,616,373 | Kendall | Feb. 2, 1927 |
| 2,152,455 | Ballentine | Mar. 28, 1939 |
| 2,382,637 | Jacks | Aug. 14, 1945 |
| 2,427,665 | Emerson | Sept. 23, 1947 |